Feb. 27, 1962 N. O. JOHANNESSON 3,022,952

APPARATUS FOR ATTENUATION CORRECTION OF
A COAXIAL CABLE USED FOR CARRIER
FREQUENCY TELEPHONY

Filed Nov. 17, 1958 3 Sheets-Sheet 1

INVENTOR
NILS OLOF JOHANNESSON
BY Hane and Nydick
ATTORNEYS

INVENTOR
NILS OLOF JOHANNESSON
BY Hane and Nydick
ATTORNEYS

Feb. 27, 1962

N. O. JOHANNESSON

APPARATUS FOR ATTENUATION CORRECTION OF A COAXIAL CABLE USED FOR CARRIER FREQUENCY TELEPHONY 3,022,952

Filed Nov. 17, 1958

3 Sheets-Sheet 3

INVENTOR
NILS OLOF JOHANNESSON
BY Hane and Nydick
ATTORNEYS

United States Patent Office 3,022,952
Patented Feb. 27, 1962

3,022,952

APPARATUS FOR ATTENUATION CORRECTION OF A COAXIAL CABLE USED FOR CARRIER FREQUENCY TELEPHONY

Nils Olof Johannesson, Hagersten, Sweden, assignor to Telefonaktiebolaget L M Ericsson, Stockholm, Sweden, a corporation of Sweden Filed Nov. 17, 1958, Ser. No. 774,393
Claims priority, application Sweden Nov. 29, 1957
5 Claims. (Cl. 235—193)

The present invention refers to an apparatus for attenuation correction of a coaxial cable intended for transmission of carrier frequency telephony. More exactly the invention refers to a manual compensation of the attenuation variations of the coaxial cable appearing from one time to another, at which are used a combination of a number of earlier known equalizers for the attenuation correction and a number of pilot frequencies, which are necessary for the carrier frequency telephony as internationally agreed upon.

Before the invention in detail is described, the problem, which is the basis for the invention, will be first discussed in some detail. The carrier frequency telephony on a coaxial cable is to a great extent a question of compensation attenuation with a great precision. As is known the main attenuation compensation is generally made by means of existing line amplifiers in connection with fixed extension and compensation nets and with automatic arrangements for controlling the attenuation variations depending on temperature of the coaxial cable. The attenuation compensation would not, however, be sufficient, if only these said elements were relied upon, for many not controllable and with time variable secondary attenuation and amplifier changes may occur also. Such changes may be caused by the aging of tubes and components in the amplifiers and the equalizer, mechanical changes in the very coaxial cable, gradual temperature and humidity changes in the amplifier boxes etc. A realistic view of the compensation problems requires that these secondary effects be observed from the beginning and a suitable compensation equipment for them is provided.

Owing to the incalculability of these attenuation variations it is difficult to foresee the exact size and the frequency course of the attenuation variations before a transmission line has been in operation during a certain time. In order to eliminate the attenuation variations, rather flexible variable equalizers are thus necessary. A well-known and suitable method is to use so called cosinus nets. Such cosinus nets are described for example in "Bell System Technical Journal," July 1953, pages 852–862.

Figure 1:
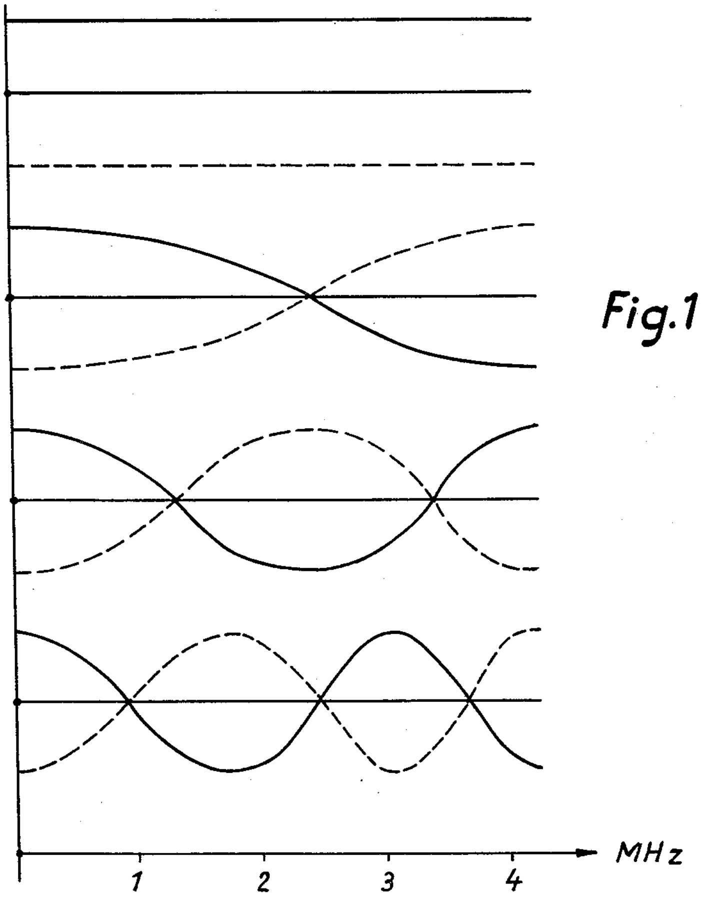
FIG. 1 shows cosinus-shaped attenuation curves obtained by means of cosinus nets, the curves being somewhat compressed by the action of high frequencies.

The name cosinus nets is really an abbreviation of "Equalizers with a variable cosinus-shaped attenuation curve." By varying the adjustment of these nets attenuation curves are obtained, which vary in a cosinus-shaped way according to FIG. 1. The adjustment is made easily by two ganging potentiometers for each part net, the attenuation for each part net being independent of the adjustment of the others. In the middle position for the adjustment of the potentiometers the cosinus net in question has a straight frequency curve. Adjustment to one or the other side of the potentiometers gives a cosinus curve more or less strongly diverging from the middle line, the first half period of which can be either positive or negative. A first cosinus net is designated 0 and means a flat control, a second cosinus net is designated 1 and gives a half wave length of a cosinus curve, a third is designated 2 and gives two half wave lengths of a cosinus curve etc. By cascade-connecting cosinus nets with successively increasing ordinals a combined attenuation curve of a more or less gratuitous shape can be obtained in the same way as within mathematics a more or less gratuitous mathematical function can be synthetized with Fourier terms. Combined cosinus nets with up to 12 part nets have been made, although in praxis 5 often is sufficient.

Figure 2:
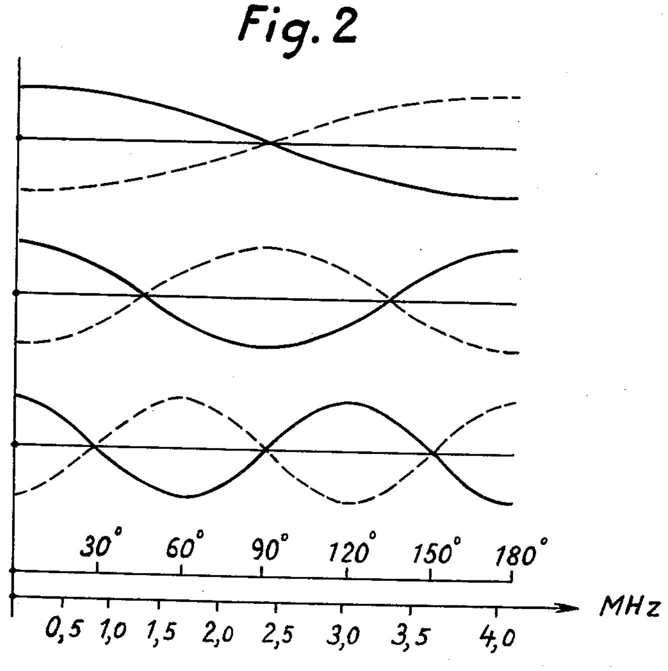
FIG. 2 shows similarly obtained attenuation curves, but in the form of pure cosinus curves due to changes in the applied frequency range.

As is shown in FIG. 1 the cosinus curves are pressed together against high frequencies, which depends on the mechanic-electric structure of the net chosen by practical reasons. If instead the frequency scale is distorted somewhat, see FIG. 2, the attenuation curves are on the other hand reproduced as pure cosinus curves with equal distance between the zero points.

In order to be able to adjust a combined cosinus net correctly so that the desired attenuation compensation is obtained, some form of harmonic analysis is evidently necessary. To do this by some trial and error method is difficult or even quite impossible. A special adjusting apparatus for this purpose must therefore be used. Such an apparatus is described in said publication, page 856 and the following. The principle is the following one:

All normal traffic is disconnected from the coaxial system line and in its place a special sweep generator is connected, which slowly is sweeping through the whole actual frequency band. In the receiving end of the line a receiver is connected, which rectifies the signal obtained in this way. The result will be a direct-current voltage + an alternating voltage with the number of cycles of the sweep frequency, at which the curve shape of the alternating voltage will conform with erroneous attenuation curve of the coaxial line + the compensation of the cosinus net. If the adjustment of the cosinus net is perfect, the amplitude of the received signal does not vary, i.e. the amplitude of the low frequency alternating voltage will be equal to 0. If the part No. 1 of the cosinus net has an erroneous adjustment, a fundamental frequency in the low frequency alternating voltage will arise. If the part No. 2 has an erroneous adjustment, the second harmonic will arise etc. By measuring by turn the amplitude of the fundamental and the amplitude of the first, second, third etc. harmonic and then by adjusting the different nets separately so that said amplitudes will be equal to 0 it is thus possible to control that a perfect adjustment is obtained.

This known method for the adjustment of the cosinus nets gives an unequivocal result and is convenient to carry out. It has, however, some disadvantages. Firstly the normal traffic is disturbed, which must be disconnected during the attenuation work. Secondly said sweep generator will be relatively complicated, as special arrangements must be made in order not to disturb pilot voltages, which are found on the line and which pilot voltages must be found at a real attenuation work. Thirdly the frequency of the sweep generator is changed linearly to the frequency, while the cosinus curves are distorted in frequency. This means that on the receiving side a certain interaction between the different part harmonic occurs, so that an attenuation adjustment must be repeated several times before the definite value is reached.

Said disadvantages are eliminated by the present invention at the same time as the advantages are kept. The normal telephone traffic is not disturbed while the attenuation work is made and moreover the compression of the cosinus curves with upward frequency at the harmonic analysis can be taken into consideration. Instead of the information from a sweep generator the erroneous attenuation values at certain discrete frequencies are utilized viz. the pilot frequencies recommended by CCITT for coaxial cable systems, see FIG. 3. For surveying the attenuation in the carrier frequency system so called pilot frequencies are used, which are sent from a certain point in the system with constant amplitude. By measuring at another point in the system the amplitudes of these pilot frequencies a measure of the attenuation will be obtained.

Said pilot frequencies are standardized for coaxial system and are used for other routine controls and therefore apparatus for sending respectively receiving these pilot frequencies are necessary. The only necessary measuring apparatus for cosinus attenuation is thus the analog computer, described in the following, which is comparatively simple.

As a basis for the analog computer there are some mathematical elements, which will shortly be shown:

Fourier analysis within mathematics is mainly based on integration. With numerical analysis a somewhat other method is used, which better could be called trigonometric interpolation. Here is the function, which is desired to be copied known in such a way that its value is indicated at certain points. A trigonometric series is then set with as many terms as the number of given points and an equation system is obtained, from which system the unknown coefficients for the cosinus terms can be calculated.

Figure 4:
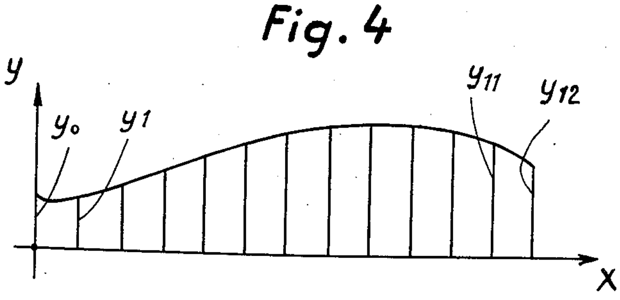
FIG. 4 is a graph showing an attenuation curve as a function of a variable angle.

Suppose that the rest attenuation curve $y$ is drawn as a function of the angle $x$, see FIG. 4, where $x$ is the variable, by means of which the attenuation curves of the cosinus nets will be purely cosinus-shaped. (The upper limit frequency=4.1mHz. corresponds to $x=180°$). The distance $x=180°$ is divided in 12 equal parts and the value of the attenuation of the points Nos. 0, 1, 2 . . . 12 is called $y_0, y_1, y_2 \ldots y_{12}$, see FIG. 4. Each interval will thus be 15°. The following cosinus series is set, where the coefficients $r$ for the present are unknown:

$$Y=r_0+r_1\cdot\cos x+r_2\cos 2x+\ldots r_{12}\cos 12x$$

This series will in each one of the points 0, 1, 2 . . . 12 conform with the given values $y_0, y_1, y_2 \ldots y_{12}$. The following equation system is obtained:

$$\left.\begin{aligned} y_0&=r_0+r_1+r_2+\ldots+r_{12}\\ y_1&=r_0+r_1\cdot\cos 15°+r_2\cdot\cos 2\cdot15°+\ldots+r_{12}\cdot\cos 12\cdot15°\\ y_2&=r_0+r_1\cdot\cos 30°+r_2\cdot\cos 2\cdot30°+\ldots+r_{12}\cdot\cos 12\cdot30°\\ &\cdot\quad\cdot\quad\cdot\quad\cdot\quad\cdot\\ y_{12}&=r_0+r_1\cdot\cos 180°+r_2\cdot\cos 2\cdot180°\\ &\qquad+\ldots+r_{12}\cdot\cos 12\cdot180° \end{aligned}\right\}$$

The following general equation for the coefficients $r$ is obtained:

$$r_n=\tfrac{1}{6}(y_0k_0+y_1k_1+y_2k_2+\ldots y_{12}k_{12})=\frac{1}{6}\sum_{n=0}^{n}y_nk_n$$

In this equation the given values $y$ are thus multiplied with coefficients $k$, which are found in the following table.

It may be observed that for the coefficients $k$ there are only 9 different number values, which are repeated with + or − signs.

| $r_n$ \ $k_n$ | $k_0$ | $k_1$ | $k_2$ | $k_3$ | $k_4$ | $k_5$ | $k_6$ | $k_7$ | $k_8$ | $k_9$ | $k_{10}$ | $k_{11}$ | $k_{12}$ |
|---|---|---|---|---|---|---|---|---|---|---|---|---|---|
| $r_0$ | $\frac{1}{4}$ | $\frac{1}{2}$ | $\frac{1}{2}$ | $\frac{1}{2}$ | $\frac{1}{2}$ | $\frac{1}{2}$ | $\frac{1}{2}$ | $\frac{1}{2}$ | $\frac{1}{2}$ | $\frac{1}{2}$ | $\frac{1}{2}$ | $\frac{1}{2}$ | $\frac{1}{4}$ |
| $r_1$ | $\frac{1}{2}$ | cos 15° | cos 30° | cos 45° | cos 60° | cos 75° | 0 | −cos 75° | −cos 60° | −cos 45° | −cos 30° | −cos 15° | $-\frac{1}{2}$ |
| $r_2$ | $\frac{1}{2}$ | cos 30° | cos 60° | 0 | −cos 60° | −cos 30° | −1 | −cos 30° | −cos 60° | 0 | cos 60° | cos 30° | $\frac{1}{2}$ |
| $r_3$ | $\frac{1}{2}$ | cos 45° | 0 | −cos 45° | −1 | −cos 45° | 0 | cos 45° | 1 | cos 45° | 0 | −cos 45° | $-\frac{1}{2}$ |
| $r_4$ | $\frac{1}{2}$ | cos 60° | −cos 60° | −1 | −cos 60° | cos 60° | 1 | cos 60° | −cos 60° | −1 | −cos 60° | cos 60° | $\frac{1}{2}$ |
| $r_5$ | $\frac{1}{2}$ | cos 75° | −cos 30° | −cos 45° | cos 60° | cos 75° | 0 | −cos 15° | −cos 60° | cos 45° | cos 30° | −cos 75° | $-\frac{1}{2}$ |
| $r_6$ | $\frac{1}{2}$ | 0 | −1 | 0 | 1 | 0 | −1 | 0 | 1 | 0 | −1 | 0 | $\frac{1}{2}$ |
| $r_7$ | $\frac{1}{2}$ | −cos 75° | −cos 30° | cos 45° | cos 60° | −cos 15° | 0 | cos 15° | −cos 60° | −cos 45° | cos 30° | cos 75° | $-\frac{1}{2}$ |
| $r_8$ | $\frac{1}{2}$ | −cos 60° | −cos 60° | 1 | −cos 60° | −cos 60° | 1 | −cos 60° | −cos 60° | 1 | −cos 60° | −cos 60° | $\frac{1}{2}$ |
| $r_9$ | $\frac{1}{2}$ | −cos 45° | 0 | cos 45° | −1 | cos 45° | 0 | −cos 45° | 1 | −cos 45° | 0 | cos 45° | $-\frac{1}{2}$ |
| $r_{10}$ | $\frac{1}{2}$ | −cos 30° | cos 60° | 0 | −cos 60° | cos 30° | −1 | cos 30° | −cos 60° | 0 | cos 60° | −cos 30° | $\frac{1}{2}$ |
| $r_{11}$ | $\frac{1}{2}$ | −cos 15° | cos 30° | −cos 45° | +cos 60° | −cos 75° | 0 | cos 75° | −cos 60° | cos 45° | −cos 30° | cos 15° | $-\frac{1}{2}$ |
| $r_{12}$ | $\frac{1}{4}$ | $-\frac{1}{2}$ | $\frac{1}{2}$ | $-\frac{1}{2}$ | $\frac{1}{2}$ | $-\frac{1}{2}$ | $\frac{1}{2}$ | $-\frac{1}{2}$ | $\frac{1}{2}$ | $-\frac{1}{2}$ | $\frac{1}{2}$ | $-\frac{1}{2}$ | $\frac{1}{4}$ |

Figure 3:
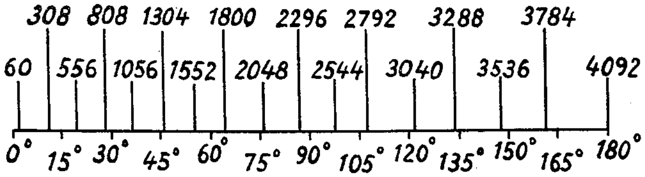
FIG. 3 is a table in graph form of pilot frequencies suitable for the purpose of the invention.

If the pilot frequencies indicated in FIG. 3 were located just in the graduation points 0°, 15°, 30° . . . 180° it would be only necessary to calculate the different coefficients $r_n$, at which $y_0, y_1, y_2 \ldots y_{12}$ corresponds exactly to the value for the pilot frequencies. However, the pilot frequencies are not located at the graduation points and therefore an interpolation must be made. It has been proved to be sufficient to make a linear interpolation between the measuring values for the pilots, which are located on both sides of a certain graduation point. For instance, the value for $y_1$, i.e. the graduation point 15°, is obtained by adding parts of the value for the pilot frequency 308 kHz. and the pilot frequency 556 kHz.

The method according to the invention is characterized by the adjustment of the attenuation of the different equalizers to a suitable shape for the coaxial cable at a certain time being made by feeding attenuation values from the said pilot frequencies to an analog computer, which in a way, known in itself, is arranged to calculate by harmonic analysis terms of the following form:

$$r_n=\frac{1}{6}\sum_{p=0}^{N}y_p^*\cdot k_{np}$$

where

N is a number, which is one digit smaller than the number for the pilot frequencies used for attenuation corrections, $p$ is a running number for equidistant points in said frequency band, $y_p^*$ is either a measured value of the difference in the transmission attenuation of the coaxial line from a desired normal value of the transmission attenuation in point $p$ or, for the cases when the pilot frequencies in question do not with sufficient carefulness coincide with the points suitable for the harmonic analysis within the frequency band, a value calculated in the analog computer through interpolation from two pilot frequencies, located near such a point, $k_{np}$ is a constant enclosed in the analog computer and given by the harmonic analysis, which refers to the equalizer that has an attenuation curve of the length of $n$ half wave lengths, and to the point $p$, and, $r_n$ is a term for the necessary attenuation adjustment of the equalizer, which has an attenuation curve of the length of $n$ half wave lengths, and by adjustment of the different equalizers to amplitude and sign in accordance with the terms $r_n$ obtained from the analog computer.

Figure 5:
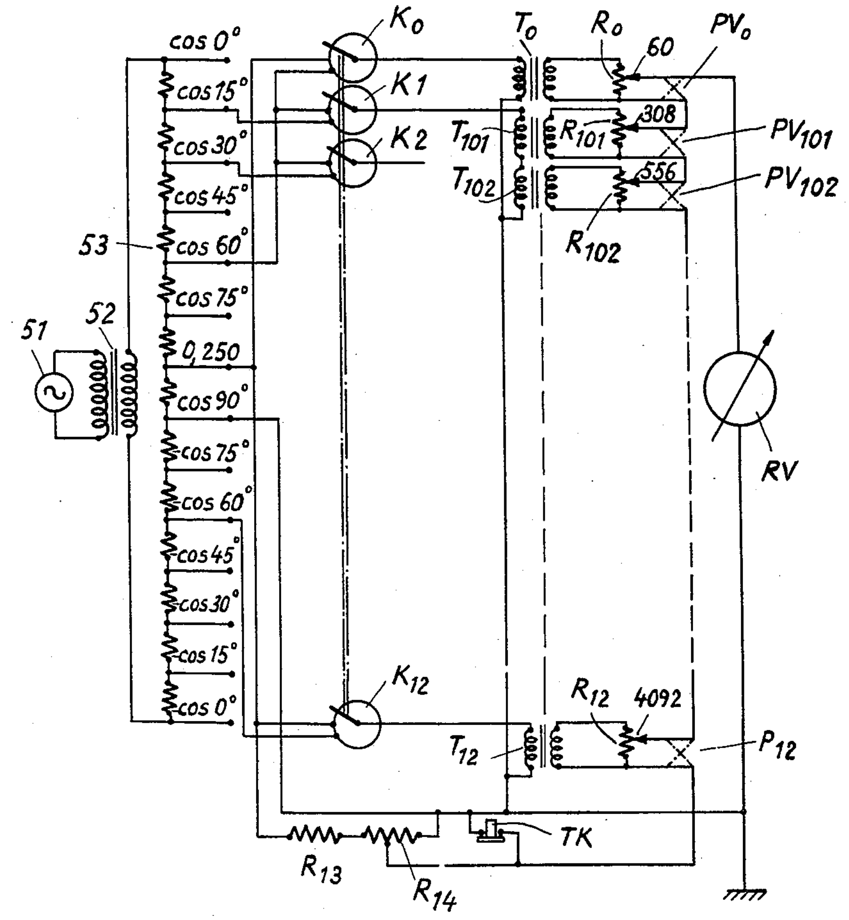
FIG. 5 is a circuit diagram of an analog computer according to the invention.

The analog computer necessary for practicing the invention will be more detailed described in connection to FIG. 5 on one of the enclosed drawings. The computer comprises mainly an oscillator 51, which feeds an alternating voltage of 1000 Hz. through a transformer 52 to a voltage divider 53 with a number (14) of terminals designated cos 0°, cos 15° . . . cos 75°, 0,250, cos 90°, −cos 75° . . . −cos 0° respectively, 13 selectors $k_0 \ldots k_{12}$ working synchronously, a number of isolating transformers $T_0$, $T_{101}$ . . . $T_{12}$, each of which has on its secondary side a potentiometer $R_0$, $R_{101}$ . . . $R_{12}$, and for each potentiometer a current reversing key, designated $PV_0$, $PV_{101}$ . . . $PV_{12}$, all the potentiometers and a tube voltmeter RV being connected in series.

The voltage divider 53 is entirely resistive and the different part resistances are chosen so that the different terminals obtain said potentials at a given moment. The potentiometers and the tube voltmeter have a high ohmic value compared with the voltage divider.

The selectors $k_0$ . . . $k_{12}$ working synchronously have each thirteen contact points, which are connected to the terminal of the voltage divider 53 so that they are in conformity with the table given before. The 0th contact point of the selector $k_0$ is thus connected to the terminal 0,250, its 1st contact point to the terminal cos 60° (=½) and so on; the 0th contact point of the selector $k_1$ is connected to cos 60° (=½), its 1st contact point to the terminal cos 15° and so on.

The isolating transformer $T_0$ has its primary winding connected between the movable arm of the selector $k_0$ and the terminal cos 90° of the voltage divider 53. The movable terminal of the potentiometer $R_0$ pertaining to this transformer is intended to be adjusted to the level difference, which has been measured for the pilot frequency 60 kHz. The isolating transformers $T_{101}$ and $T_{102}$ have their primary windings connected mutually in series and connected between the movable arm of the selector $k_1$ and the terminal cos 90° of the voltage divider 53. The movable terminal of the potentiometer $R_{101}$ pertaining to the transformer $T_{101}$ is intended to be adjusted to the level difference, which has been measured for the pilot frequency 308 kHz, and the movable terminal of the potentiometer $R_{102}$ pertaining to the transformer $T_{102}$ is intended to be adjusted to the level difference, which has been measured for the pilot frequency 556 kHz. The ratio transformation of the transformers $T_{101}$ and $T_{102}$ are chosen so that these transformers together through the potentiometer terminals give a combined voltage component, which is representative for the level difference just in the graduation point 15° in FIG. 1. The other isolating transformers are in the same way connected to the respective selector. The current reversing key $PV_0$, $PV_{101}$ . . . $PV_{12}$ exists in order to make the adjustment of the level difference possible with a positive or a negative sign.

When all potentiometer terminals have been adjusted to level difference, which have been obtained through pilot frequencies all selectors $k_0$ . . . $k_{12}$ are adjusted to the 0th contact point, after which the tube voltmeter RV is read. Thereby the absolute amount for the coefficient $r_0$ is obtained. Its sign is obtained through pressing a button TK, the one contact of which is connected to the terminal cos 90° on the voltage divider, and the second contact of which is connected to the fixed terminal of the potentiometer $R_{12}$ and to a point on a voltage divider $R_{13}$—$R_{14}$, which is connected between the terminals cos 90° and 0,250. When the button TK is pressed down, a positive voltage component is thus inserted in said series connection of the potentiometers and the tube voltmeter. If the tube voltmeter increases its reading, the coefficient $r_0$ is positive, and if the tube voltmeter decreases its reading, the coefficient $r_0$ is negative. When the coefficient $r_0$ is univocally determined, all selectors $k_0$ . . . $k_{12}$ of the 1st contact point are adjusted to the 1st contact point, which can be effected automatically, whereupon the tube voltmeter RV is read and so on. In this way all coefficients $r_0$ . . . $r_{12}$ are determined, and so the equalizer pertaining to the carrier frequency system in question can be adjusted with guidance of the obtained values for the coefficients.

I claim:

1. An analog computer for computing coefficients conforming to the equation $$r_n=\sum_{n=0}^{n} y_n k_n$$

where $k_0$, $k_1$ . . . $k_n$ are constants and $y_0$, $y_1$ . . . $y_n$ are variables, said computer, comprising in combination, an A.-C. voltage source, a voltage divider connected in circuit with said voltage source and having $n$ taps, a plurality of ganged selectors each having $n-1$ stationary contacts and a contact selector arm movable into engagement with a selected one of said contacts, said divider taps and selector contacts being connected in a circuit pattern such that said selector arms are settable in positions in which the arms are connected to taps corresponding to the actual values of the constants for the coefficient $r_n$, a plurality of transformers each having a primary and a secondary, one terminal of each primary being connected to one of the selector arms and the other terminal to a tap common to said transformer terminal, a plurality of potentiometers each connected to the secondary of a respective one of said transformers, and indicating means, said potentiometers being connected in series with each other and with said indicating means, said potentiometers being settable in accordance with said variables.

2. A computer according to claim 1 wherein said voltage divider is a resistive divider.

3. A computer according to claim 2 wherein said indicating means is a tube voltmeter, said voltmeter and said potentiometers having a high ohmic resistance in comparison with said voltage divider.

4. A computer according to claim 1 and comprising an auxiliary A.-C. voltage source connectable in a series circuit with said series connected potentiometers and said indicating means, and switch means included in said series circuit for applying the voltage of said auxiliary source to said series circuit by actuating said switch means.

5. A computer according to claim 4 wherein said auxiliary voltage source comprises a voltage divider.

References Cited in the file of this patent

UNITED STATES PATENTS

| | | |
|---|---|---|
| 2,876,283 | Lundry | Mar. 3, 1959 |
| 2,878,317 | Evans | Mar. 17, 1959 |

OTHER REFERENCES

Ketchledge et al.: The Bell System Technical Journal, vol. 32, No. 4, July 1953, pp. 852–862.